United States Patent Office 3,391,674
Patented July 9, 1968

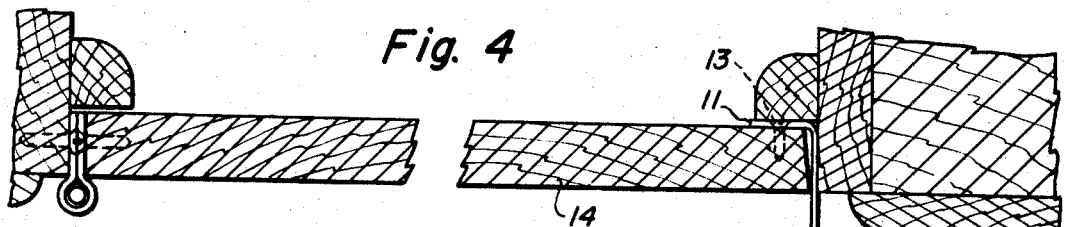
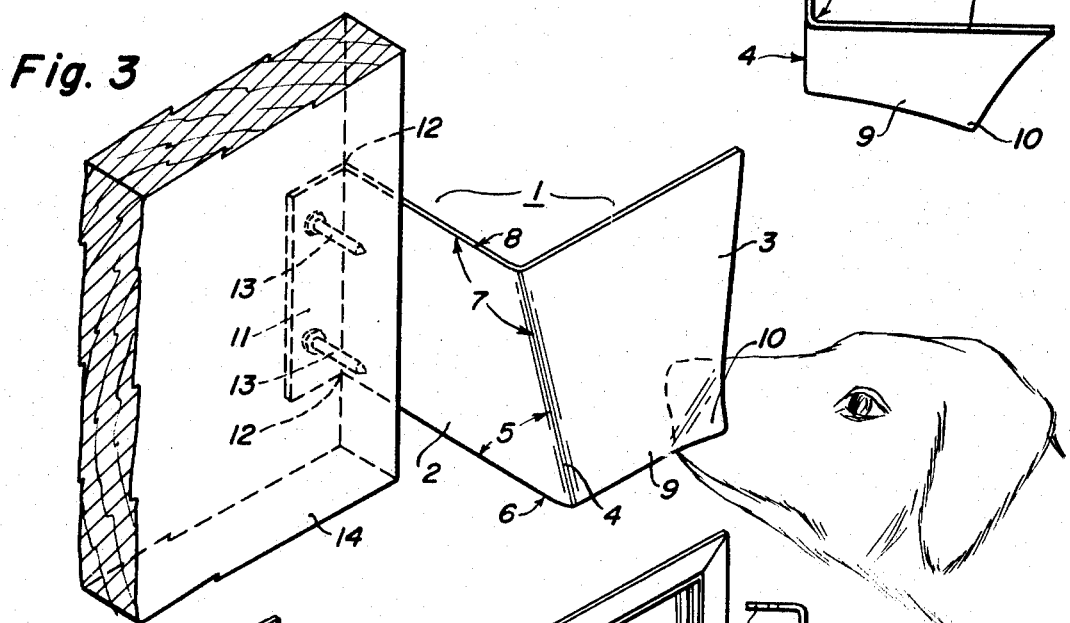
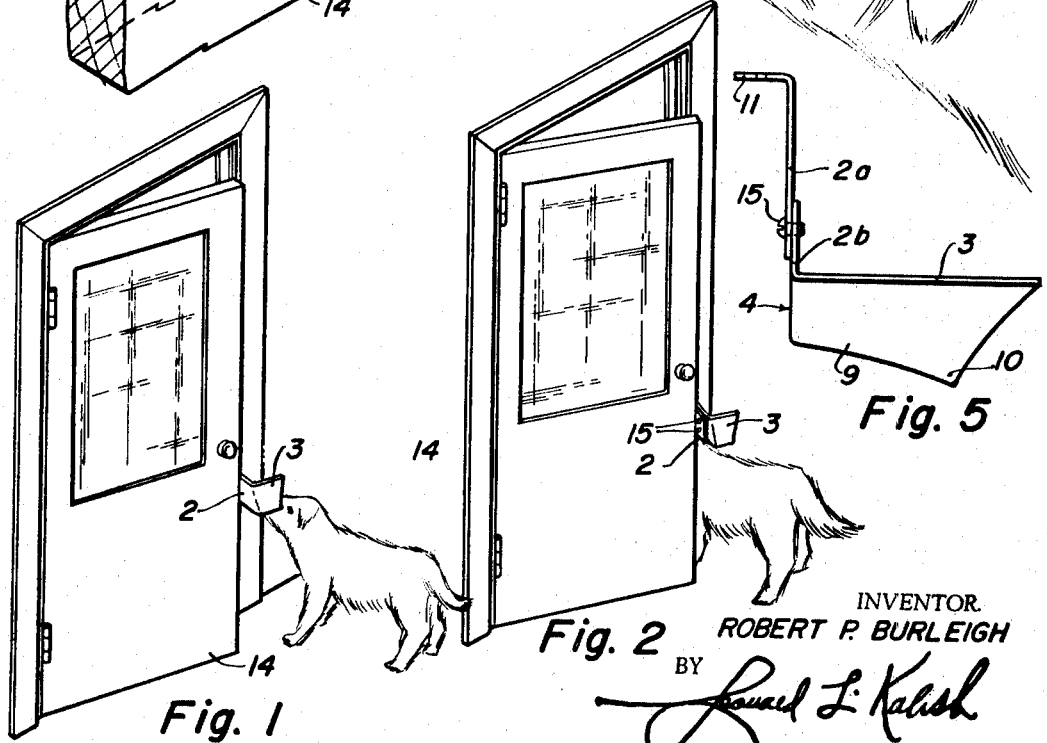

3,391,674
ANIMAL OPERATED DOOR OPENING DEVICE
Robert P. Burleigh, Collegeville Ave., Trappe,
Collegeville, Pa. 19426
Filed June 8, 1966, Ser. No. 561,669
8 Claims. (Cl. 119—29)

The present invention relates to a door-opener adapted to be mounted on a spring-closed or spring-biased or gravity-closed entrance-door to enable a dog to open such door with his snout, while the door is unlatched, as, for instance, a screen door or like outside door.

The object of the present invention is a door-opener of the character stated which will be inexpensive and may be readily mounted on the door and which will be effective for the purpose above stated.

In the accompanying drawings, like reference characters indicate like parts,

FIGURE 1 represents a perspective view of a screen-door with the door-opener mounted thereon, showing its operative engagement by a dog.

FIGURE 2 is a similar perspective view but with the screen-door opened sufficiently for the dog to enter.

FIGURE 3 represents an enlarged perspective view of a fragmentary portion of the door and the door-opener thereon, engaged by a dog.

FIGURE 4 is a horizontal cross-sectional view of the door and the two door-jambs, with the door-opener mounted on the door.

FIGURE 5 represents a top plan view of an adjustable embodiment of my door-opener.

The door-opener of my invention, designated generally by the reference-numeral 1, is preferably made of sheet-metal, as, for instance, sheet-steel, sheet-brass or sheet-aluminum or the like, and comprises the fore-and-aft spacer panel or portion 2 and the outer lateral panel or portion 3 formed more or less at a right angle to each other, and formed in continuation of each other along the bend-line 4. The outer panel 3 is flared outwardly in a downward direction as indicated particularly in FIGURES 3 and 4, by making the bend-line 4 at an acute angle 5 to the lower horizontal edge 6 and at an obtuse angle 7 to the upper horizontal edge 8 of the spacer-panel 2. The lower free corner 9 of the front panel 3 may also further be bent outwardly so as to permit the dog more readily to place his snout behind the panel 3 without the corner portion 10 injuring its snout.

An inner securement-flange 11 is formed along the rear vertical edge 12 of the fore-and-aft spacer-panel 2, along a bend-line coincident with such inner edge 12.

Screws or other suitable fasteners 13 are extended through corresponding holes in the securement-flange 11 and into the door 14, as indicated in FIGURES 3 and 4.

My door-opener is intended for outer screen doors or storm doors which are closed by a spring or the like, and which are generally unlatched, and is also intended for spring-closed or gravity-closed doors of dog-houses, animal shelters and pens and fence-gates.

When the door is so closed by the spring or by gravity, the dog places its snout behind the front portion or panel 3, and generally beneath the outwardly flared portion 9 thereof, as indicated in FIGURE 1. By then swinging his head in a direction to open the door, it can open the door and thereby enter through the door as indicated in FIGURE 2.

In FIGURE 5 I have shown a modified embodiment of my door-opener, in which spacer panel or portion 2 is formed of two parts, designated as 2a and 2b, respectively, which overlap each other and which are secured to each other by a pair of vertically aligned and spaced headed screws 15 which extend through horizontal stem-clearance slots in the panel 2a and are screw-threaded into registering threaded holes in the panel 2b, as indicated in FIGURE 5. By this means, the distance of the snout-engageable panel or portion 3 from the door 14 may be adjusted so as to vary the snout-opening or snout-clearance.

I may also similarly form the snout-engageable panel or portion 3 of two overlapping portions adjustably secured to each other in a similar manner by headed screws extended through horizontal stem-clearance slots in one of the portions and threaded into threaded holes in the other portion. By this means my door-opener may be optionally applied to a right-hand door or to a left-hand door.

I may also make my door-opener of a plastic of suitable strength, either molded or otherwise formed, and I may also make the door-opener of plastic reinforced with glass fiber.

Having generally described my invention, I claim the following:

1. An animal operated door-opener for use by dogs and other pet animals, including a spacer portion secured to the free edge-zone of the door and extending outwardly therefrom below the conventional door knob or handle of the door, a snout-engageable portion connected with the spacer portion and disposed at an angle thereto and extending in a direction away from said free-edge zone, with at least a portion thereof flared outwardly.

2. A door-opener according to claim 1, including a securement-flange extending from the inner edge of the spacer portion thereof, whereby said door-opener is secured to the edge-zone of the door.

3. A door-opener according to claim 1, formed of a single piece of sheet-metal bent on itself to form the two portions thereof mentioned in claim 1.

4. A door-opener according to claim 3 with the bend-line disposed at an acute angle to the plane of the door.

5. A door-opener according to claim 1 in which the spacer portion includes an inner and an outer portion overlapping each other and generally parallel with each other and detachably secured to each other so as to permit the adjustment of the distance of the outer spacer portion with respect to the door; the snout-engageable portion being connected with the outer of the two spacer portions and being disposed at an angle thereto.

6. A door-opener according to claim 1, in which the snout-engageable portion comprises two overlapping and generally parallel portions adjustably secured to each other to permit spacial adjustment of the two snout-engageable portions in relation to each other.

7. An animal operated door-opener for use by dogs and other pet animals, including a first spacer portion secured to the free edge-zone of the door and extending outwardly therefrom, a second spacer portion overlapping the first spacer portion and adjustably secured thereto so as to permit the adjustment of the distance of the second spacer portion in respect to the door, and snout-engageable portion carried by said second spacer portion and disposed at an angle thereto and extending in a direction away from said free-edge zone.

8. An animal operated door-opener for use by dogs and other pet animals, including a first spacer portion secured to the free edge-zone of the door and extending outwardly therefrom, a second portion overlapping and adjustably secured to said first spacer portion and a snout-engageable portion disposed at an angle to said second portion in a direction away from said free edge-zone at a height suitable to be reached by the animal.

References Cited

UNITED STATES PATENTS

| | | | |
|---|---|---|---|
| 1,752,123 | 3/1930 | Thompson | 119—54 |
| 2,275,887 | 3/1942 | Chandler | 119—54 |
| 2,687,114 | 8/1954 | Tuddenham | 119—54 |
| 2,914,024 | 11/1959 | Hobbs | 119—54 |
| 3,121,907 | 2/1964 | Stebbins | 16—110 |
| 3,204,608 | 9/1965 | Snitz | 119—54 |

ALDRICH F. MEDBERY, *Primary Examiner.*